(12) United States Patent
Odinokov et al.

(10) Patent No.: US 11,607,698 B2
(45) Date of Patent: Mar. 21, 2023

(54) SPRAYING DEVICE FOR LIQUID MEANS OF CHEMICAL TREATMENT WITH REPLACEABLE LIQUID SUBSYSTEM AND SPRAYING SYSTEMS ON THE BASIS THEREOF

(71) Applicant: ROBOTOPIA UAB, Vilnius (LT)

(72) Inventors: Sergey Odinokov, Vilnius (LT); Linas Samuolis, Vilnius (LT)

(73) Assignee: ROBOTOPIA UAB, Vilnius (LT)

( * ) Notice: Subject to any disclaimer, the term of this patent is extended or adjusted under 35 U.S.C. 154(b) by 441 days.

(21) Appl. No.: 16/652,718

(22) PCT Filed: Aug. 20, 2018

(86) PCT No.: PCT/IB2018/056286
§ 371 (c)(1),
(2) Date: Apr. 1, 2020

(87) PCT Pub. No.: WO2019/073314
PCT Pub. Date: Apr. 18, 2019

(65) Prior Publication Data
US 2020/0246819 A1 Aug. 6, 2020

(30) Foreign Application Priority Data

Oct. 10, 2017 (LT) ...................................... 2017078

(51) Int. Cl.
*B05B 11/10* (2023.01)
*A01M 7/00* (2006.01)
(Continued)

(52) U.S. Cl.
CPC ........... *B05B 11/10* (2023.01); *A01M 7/0042* (2013.01); *A01M 7/0075* (2013.01);
(Continued)

(58) Field of Classification Search
CPC .... B05B 11/30; B05B 11/047; A01M 7/0042; A01M 7/0075; A01M 7/0089;
(Continued)

(56) References Cited

U.S. PATENT DOCUMENTS 3,991,758 A 11/1976 Mohrke et al.
6,175,420 B1 * 1/2001 Barry ...................... G01N 21/31
436/164
(Continued)

FOREIGN PATENT DOCUMENTS

CA 2567559 A1 * 8/2007 ........... B01D 61/147
CA 2953378 A1 1/2016
(Continued)

OTHER PUBLICATIONS

International Search Report for PCT/IB2018/056286 dated Nov. 15, 2018, 3 pages.

*Primary Examiner* — Donald J Wallace
*Assistant Examiner* — Jalal C Coduroglu
(74) *Attorney, Agent, or Firm* — Lowenstein Sandler LLP

(57) ABSTRACT

The invention is intended for the organization of an automated process for spraying of liquid means of chemical treatment from unmanned vehicles, for example, in precise farming systems. The invention provides the use of a replaceable, marked and hermetically sealed liquid subsystem with integrated pumping chambers in a spraying device together with an integrated self-diagnosis system allowing to ensure personnel safety and the accounting of the resources of main components of the spraying device. All this in combination enables to create fully automated spraying systems.

20 Claims, 6 Drawing Sheets

(51) Int. Cl.
    *B05B 11/04*         (2006.01)
    *B64C 39/02*         (2023.01)
    *B64D 1/18*          (2006.01)
    *B64F 1/36*          (2017.01)
    *B64U 101/00*       (2023.01)

(52) U.S. Cl.
    CPC ......... *A01M 7/0089* (2013.01); *B05B 11/047* (2013.01); *B64C 39/024* (2013.01); *B64D 1/18* (2013.01); *B64F 1/36* (2013.01); *B64U 2101/00* (2023.01); *B64U 2201/20* (2023.01)

(58) Field of Classification Search
    CPC ............... A01M 7/0085; B64C 39/024; B64C 2201/12; B64C 2201/146; B64D 1/18; B64F 1/36
    See application file for complete search history.

(56) References Cited

U.S. PATENT DOCUMENTS

| | | | | |
|---|---|---|---|---|
| 6,560,806 | B1* | 5/2003 | Lawson | B05B 15/656 8/158 |
| 7,784,715 | B2* | 8/2010 | Kress | B05B 7/2445 137/564.5 |
| 2008/0123466 | A1* | 5/2008 | Thompson | B01F 31/29 222/145.6 |
| 2008/0173705 | A1* | 7/2008 | Girard | B67D 1/0031 222/64 |
| 2008/0178940 | A1* | 7/2008 | Kress | A01M 7/0092 137/268 |
| 2011/0186657 | A1* | 8/2011 | Haviland | F41B 9/0087 239/722 |
| 2011/0198413 | A1* | 8/2011 | Thompson | F04B 17/03 239/332 |
| 2011/0272493 | A1* | 11/2011 | Richardson | B05B 11/3016 239/526 |
| 2013/0277455 | A1* | 10/2013 | Thompson | B05B 9/0866 239/289 |
| 2014/0246506 | A1* | 9/2014 | Maas | B29C 66/849 239/302 |
| 2014/0303814 | A1* | 10/2014 | Burema | A01C 21/00 901/1 |
| 2015/0059626 | A1* | 3/2015 | Conrad | A01M 9/0092 111/120 |
| 2016/0069743 | A1* | 3/2016 | McQuilkin | B05B 11/3038 239/302 |
| 2017/0129605 | A1* | 5/2017 | Wu | B05B 12/02 |
| 2017/0152843 | A1 | 6/2017 | Bei et al. | |
| 2017/0374323 | A1* | 12/2017 | Gornik | B05B 11/3016 239/526 |
| 2018/0035606 | A1* | 2/2018 | Burdoucci | F04B 23/02 239/332 |
| 2019/0366375 | A1* | 12/2019 | Thompson | B05B 15/656 8/158 |

FOREIGN PATENT DOCUMENTS

| | | | | |
|---|---|---|---|---|
| CN | 101733223 A | * | 6/2010 | .......... B01D 61/147 |
| CN | 101733223 A | | 6/2010 | |
| CN | 105438475 A | * | 3/2016 | |
| CN | 105438475 A | | 3/2016 | |
| CN | 105882973 A | * | 8/2016 | ............... B64D 1/18 |
| CN | 105882973 A | | 8/2016 | |
| CN | 105966622 A | | 9/2016 | |
| CN | 106035295 A | * | 10/2016 | |
| CN | 106035295 A | | 10/2016 | |
| CN | 106043702 A | * | 10/2016 | ............. B64C 39/02 |
| CN | 205633070 | | 10/2016 | |
| WO | WO-2007014690 A1 | * | 2/2007 | .......... A01M 7/0092 |

\* cited by examiner

SPRAYING DEVICE FOR LIQUID MEANS OF CHEMICAL TREATMENT WITH REPLACEABLE LIQUID SUBSYSTEM AND SPRAYING SYSTEMS ON THE BASIS THEREOF

CROSS-REFERENCE TO RELATED APPLICATION(S)

This application is a national phase of International Application No. PCT/IB2018/056286, filed on Aug. 20, 2018, which claims the benefit of Lithuanian Patent Application No. 2017 078, filed on Oct. 10, 2017. The contents of these applications are hereby incorporated by reference in their entirety.

FIELD OF INVENTION

The invention is related to the field of agriculture and forestry, namely to devices for treating of agricultural areas, forest lands and other areas by spraying liquid means of chemical treatment, in general with a spraying device installed on an unmanned vehicle, in particular on an unmanned aerial vehicle.

The invention is intended for the dosed distribution of liquid means for chemical treatment in precision agriculture systems, including both fertilizers, plant growth stimulators and analogous materials, as well as for combating harmful insects, pests and weeds and plants along roads, pipelines and so on.

BACKGROUND OF THE INVENTION

Sprayed liquids used in agriculture and other industries are usually poisonous. Any operation involving such liquids (refilling, spraying, spilling and washing) poses a risk to personnel health, therefore requires special safety measures.

High rate of mortality from pesticides and poisonous substances is typical for the agricultural industry [(http://www.aljazeera.com/news/2017/03/200000-die-year-pesticide-poisoning-170308140641105.html)], which indicates the insufficiency of the available protective means. Liquid, that is hazardous to the personnel, remains in the units of spraying device (in reservoirs, connecting hoses, filters, sprayers, nozzles, liquid pumps and valves). Known devices for spraying of liquid means of chemical treatment typically comprise a housing; reservoir for liquid means; spraying unit(s) with sprayer(s); spraying device controller (optionally); liquid transport system, comprising set of liquid hoses, and means for ensuring the flow of liquid through the liquid transport system from the reservoir to the spraying unit(s). A pump is used in some known devices as a means for ensuring flow of liquid through the liquid transport system from the reservoir to the spraying unit(s).

One way or another, known solutions often mention a liquid subsystem as an integral part of spraying devices for liquid means of chemical treatment, including those installed on an unmanned vehicle. Generally the liquid subsystem is usually comprising a reservoir for liquid means of chemical treatment, provided with an outlet channel, and liquid hoses connected thereto. Existing spraying devices for unmanned vehicles have a statically assembled structure of significant size, thus complicating the entire system service and compliance with the work safety standards. Besides, the residual liquid and its vapour over a longer period of time are also harmful to the elements of spraying device and the unmanned vehicle, carrying it.

Current devices do not have an unified standard of reliability for their components and it is not possible to track the service life of components coming into contact with the liquid, therefore they do not provide neither safety nor reliability. In part of current technical solutions, liquid splashes freely in a large fixed volume, therefore, as liquid is consumed, this causes the unmanned vehicle to swing due to a shift of centre of gravity.

There is a number of patents known, in which the spraying device comprises a rigid tank, containing an elastic reservoir with liquid means of chemical treatment, or they are separated with an elastic membrane. The rigid tank limits the maximum expansion of the elastic bag. Under constant pressure of the walls of elastic (flexible) bag on the liquid, the liquid splashing issue is partially solved.

In patent application CN106035295A, the elastic bag (reservoir) is placed inside a rigid tank and is provided with inlet and outlet channels. The main disadvantage of this is that the bag is made as a stationary detail of the tank and is not replaceable. Similar solution is disclosed in patent application CN 105882973A, where an elastic inner bag for pesticides is placed in a container filled with elastic material. During refilling the filler is compressed and, as the liquid is consumed, the filler fills the free spaces in the container.

In another patent CN105966622A, there is a special elastic membrane inside the reservoir for pesticides, which covers part of the liquid surface, so that the liquid is between the inner surface of the reservoir and the membrane. Such structure prevents splashing of liquid as it is consumed.

In the aforesaid spraying devices, the universality of mounting and operation versatility of the liquid transport system is not achieved, the problem of the utilization of a used liquid transport system is not solved, high personnel safety level has not been reached; their design and maintenance are complicated; and it is not possible to easily replace the liquid transport system without the participation of a qualified personnel.

In related technical fields there are also many known devices and methods of storing the liquid in disposable reservoirs, for example, for hair dyeing (CA2953378A1, etc.), for storing doses of medicine (U.S. Pat. No. 3,991,758, etc.), which are provided with channels for the liquid (liquid subsystem elements).

In plurality of known spraying devices a pump is used as a means ensuring liquid transportation through the liquid transport system from the reservoir to the spraying unit(s).

In patent WO2016/192023 (US2017/0152843) the spraying device, mounted on an unmanned aerial vehicle, is based on a pump, where a brushless motor is used; possible connection with the spraying unit (liquid subsystem) is described. The patent assumes that there may be a pumping chamber installed in the pump. The main drawback is that the patent does not describe the pumping chamber and its properties; it is likely that the pumping chamber is an integral part of the pump and cannot be replaced; the properties of the liquid system are not described.

In the patent application WO 2016/192024 (US2017/0129605 A1) the spraying device is also based on a pump; the spraying device is mounted on an unmanned aerial vehicle. In the spraying device described in WO 2016/192024 (US2017/0129605 A1) the diaphragm pump is used and liquid flow rate is set by the cycle frequency of this pump. The application mentions a liquid transport system (liquid subsystem), through which liquid flows from the reservoir into the sprayers (spraying units).

The main disadvantage and problem of the known solution is that the pumping chamber and properties thereof are not described; the liquid subsystem is stationary and it is not removable and entirely replacable for a new one without great efforts. Therefore, when refilling the spraying device and servicing it, personnel's contact with the contents or residues of the content of the liquid transport system cannot be avoided, and this may be dangerous for the service personnel.

Other drawbacks of the technical solution discussed is that the spraying device is designed for an unmanned aerial vehicle only and is not used with an unmanned ground vehicle. Spraying device installation and application versatility, high level of safety for the personnel, and the possibility to easily replace the liquid subsystem without the participation of a qualified personnel, equipped with pritective means, are not achieved in the solution provided by WO2016/192024 (US2017/0129605 A1), and the problem of the utilization of used liquid subsystem is not solved as well. According to solution of patent CN105438475A, liquid is stored in reservoirs and is sprayed through the nozzle (spraying unit), the device is refilled through a special feeding box with a screw cap. Increased pressure required for spraying liquid is created by the pump. The spraying device is designed to be mounted on an unmanned aerial vehicle. Main disadvantages of such a solution are that the refilling of spraying system is not automated (the personnel participation is not excluded), it is designed for the spraying device of unmanned aerial vehicle only, and the liquid subsystem is stationary and non-replaceable. Other drawbacks of this technical solution is that despite a pump is used, however the control method of sprayed liquid flow is not provided. Liquid is sprayed only one way (through the nozzles) and only in one direction, vertically downward. Liquid channels in this spraying device are arranged strictly vertically only, which increases the dimensions of the structure.

Publication WO2014160589 (US2014/0303814A1) discloses the use of a spraying system and unmanned aerial vehicles in agriculture and points out the need for an automated refilling subsystem (refilling module), for charging of batteries of the unmanned vehicles, base station for parking and storage of unmanned vehicles, as well as the need for software for control systems and communication with the unmanned vehicles. The personnel's contact with the contents of the liquid system and residues of the content is not considered in this application.

The technical solution under US2014/0303814A1 does not provide the refilling of the refilling subsystems themselves by unmanned vehicles, and does not provide the diagnostics of unmanned vehicles or spraying devices thereof, connected for refilling.

Other drawbacks of the said technical solution are that the spraying system is stationary and designed for an unmanned aerial vehicle namely; it is not used with an unmanned ground vehicle; and the liquid system cannot be replaced.

The following definitions are used in this description:

Session—unmanned motion unit, defining both the spatial distribution of the area to be treated and the parameters of spraying (bandwidth, liquid flow, speed of motion or flight).

DISCLOSURE OF THE INVENTION

Summary of the Invention

Known devices do not solve the problem regarding regular personnel's contact with substances, harmful to health, during servicing of the spraying systems for liquid means of chemical treatment, for example, when refilling them, particularly when washing, drying or replacing reservoirs for means of chemical treatment and other elements. In addition, the centre of gravity of the structures of these spraying devices is not stable during spraying; the spraying devices are not automated and their utilization possibilities are limited. The parts of known devices are also non-standardized, therefore it is not possible to track the service life of units, contacting with the liquid, which means that known devices are not safe and are unreliable. After the spraying devices are used and until their utilization, hazardous liquid still remains in the units of these devices, which liquid residues are also harmful to the elements of the spraying devices and to the unmanned vehicles, carrying them.

The used pumps have stationary pumping chambers, the emptying and washing of which is difficult or impossible.

The technical task of this invention is to create a spraying system which would provide:
high reliability and safety of the spraying device to service personnel,
possibility to replace the whole liquid subsystem,
stability of the centre of gravity, so that the unmanned vehicle could be orientated more precisely in space,
automated spraying device refilling in refilling stations and replenishment of the refilling stations from spraying devices.

To solve the listed problems a complex technical solution is proposed, which comprises the whole set of features and objects, as disclosed in the claims of the invention.

A liquid subsystem for use in a spraying device for liquid means of chemical treatment, mounted on an unmanned vehicle, is comprising a reservoir for liquid means of chemical treatment, provided with an outlet channel, and liquid hoses, connecting to the reservoir. Novel is, that the liquid subsystem according to present invention is designed as an entirely replaceable device, wherein the hermetic reservoir is made in the form of a bag, impermeable for a liquid medium.

The liquid subsystem further comprises a manifold with one or more outlet ports, which is connected to the outlet channel of the reservoir through the manifold channel. Each liquid hose of the liquid subsystem at one end is hermetically connected to one of the manifold outlet ports, and at the other end is provided with a lock valve, which is closed in a disconnected state.

According to this invention, the liquid subsystem is further comprising a sealable storage bag. Besides, the liquid subsystem is further comprising a contactless tag. The contactless tag is made as a barcode, two-dimensional code or contactless radio frequency tag.

In one embodiment of the invention the contactless tag is containing read-only information. This read-only information is comprising a unique identifier of the liquid subsystem, and/or date of manufacture, and/or warranty expiry date, and/or designation of compatibility with various liquids, and/or designation of maximum operating pressure, and/or number of provisioned cycles of use.

According to the invention the contactless tag may further comprise the variable indicators of the liquid subsystem. The variable indicators, for example, may comprise an identifier of the used liquid type, and/or the impermeability status of the liquid subsystem, and/or a counter for the cycles of use.

The manifold channel of the liquid subsystem according to present invention is provided with one or more measuring sections for being placed into outer liquid flow sensor(s) and/or liquid presence detector(s). Any of measuring sensors, into which said measuring section is placed, may be ultrasonic, optical, inductive or capacitive.

The liquid subsystem of present invention is further comprising either one central or several individual pumping chambers of liquid pump(s), wherein said pumping chambers are integrated into the liquid subsystem to be replaced together with it, while the size and form of the pumping chamber are defined by the type of appropriate liquid pump.

In one embodiment of present invention, in the presence of a single central pumping chamber of the liquid pump, the manifold connecting channel is equipped with said central pumping chamber. In this case the central pumping chamber is placed into the operating area of the central pumping engine of appropriate central liquid pump.

In another embodiment of present invention, in the presence of several individual pumping chambers of the liquid pump, each liquid hose, designed for connecting with an appropriate spraying unit, is equipped with said individual pumping chamber. In this case each individual pumping chamber is placed into the operating area of the pumping engine of appropriate individual liquid pump.

According to the invention, material of liquid-impermeable reservoir is selected from a group of chemically inert polymeric materials, comprising single- or multilayer films of thermoplastic polyurethane, silicone, rubber, polyimide, polyethylene and polyamide, preferably is thermoplastic polyurethane.

The key object of present invention is a spraying device for liquid means of chemical treatment, mounted on an unmanned vehicle and comprising a housing, a reservoir for liquid means, spraying unit(s) with sprayer(s), spraying device controller, liquid transport system with a set of hoses, and means for transporting of liquid through the liquid transport system from the reservoir to the spraying unit(s).

Novel is, that in the spraying device of present invention:
reservoir and the liquid transport system are made in the form of an entirely replaceable liquid subsystem of present invention as defined above, wherein reservoir is embedded into a basket of the spraying device;
means for transporting of liquid from the reservoir to the spraying unit(s) are comprising one or several liquid pumps, whose pumping chamber(s) is(are) integrated into said replaceable liquid subsystem;
each spraying unit is hermetically connected with a lock valve of an appropriate liquid hose of the liquid subsystem described above;
spraying device controller is the session controller, which is designed to control flow rate, taking into account the readings of feedback sensor.

The spraying device of present invention is further comprising a compression mechanism, pressing the reservoir to the bottom of the basket.

Each liquid pump of the spraying device of the invention is a positive displacement pump, for example of peristaltic, diaphragm or piston type or of any other appropriate type.

The spraying device according to present invention is comprising either a single central or, alternatively, several individual pumping engines which, together with appropriate deformable pumping chambers, form either a single central pump or, alternatively, several individual pumps.

The spraying device according to present invention may comprise more than one liquid subsystem disclosed above.

The liquid subsystem of the invention is fixed in the nodes of spraying device with the possibility of quick installation, dismantling and/or replacement thereof The spraying device of present invention is provided with one or more liquid refilling valves, each being connected to manifold through an appropriate liquid hose of the liquid subsystem, and which is designed for refilling of liquid subsystem with liquid means of chemical treatment. Said liquid refilling valves are controlled by the refilling station, and being disconnected from the refilling station, they do not allow neither air nor liquid to pass in neither direction. Said liquid refilling valve(s) is(are) designed for automated refilling and/or emptying of the spraying device of present invention.

In the preferred embodiment of the invention each spraying unit is comprising a lock valve actuator.

Any said spraying unit is comprising one or more sprayer(s).

Any sprayer of the spraying unit according to present invention is of siphon, centrifugal or disk type, is an airless type nozzle or is an air-assisted nozzle.

The feedback sensors of the spraying device according to present invention are comprising at least the liquid flow sensor(s) and/or liquid presence detector(s).

The session controller of spraying device according to present invention is a microprocessor based device. The session controller is designed to regulate liquid flow by controlling the frequency of movements of pumping engines, deforming the appropriate pumping chambers.

The spraying device according to present invention is equipped with a liquid subsystem's contactless tag reader, which is connected to the session controller.

The spraying device is equipped with a communication channel(s), over which the session controller is interacting with the motion controller of the unmanned vehicle.

In the embodiment of present invention the unmanned vehicle is serving as an energy source for the session controller of the spraying device. The energy supplied to the session controller from the unmanned vehicle is serving also as an energy for powering other elements of spraying device.

The entire housing of the disclosed spraying device or part thereof may serve as the basket. The basket might be equipped with a hinged or removable lid.

In one of the embodiments of present invention housing or frame of the unmanned vehicle is serving as the housing of the spraying device. The housing is comprising trusses/masts, onto which spraying units and optionally other components of spraying device are installed, wherein trusses/masts are made static, telescopic or foldable.

In the preferred embodiment of the present invention the spraying device is made in the form of a module designed to be installed on an unmanned vehicle. The spraying device, made as said module, is designed for automated installation, removal or replacement on an unmanned vehicle.

According to the invention in a spraying system of liquid means of chemical treatment, wherein the spraying system comprise one or more unmanned vehicles with mounted spraying devices, a complex of one or more ground stations for automated refilling of said spraying devices, mounted on an unmanned vehicle, and a control station, controlling said complex of ground stations and motion of unmanned vehicle(s), wherein the disclosed above spraying device(s) are used, and said complex of ground stations is comprising a station(s) equipped at least with:
landing module, designed for reliable positioning therein of an unpowered unmanned vehicle(s), and
refilling module, which is connected to the compressed gas source and liquid source, and which is designed for the automated refilling of said spraying device, mounted on an unmanned vehicle, located in the landing module, with sprayable liquid by connecting to the liquid refilling valve(s) of said spraying device.

The unmanned vehicle of the spraying system of liquid means according to the invention may be equipped with more than one spraying device(s) described above.

The refilling module of the spraying system of liquid means may be connected to one or more liquid sources.

Any liquid source connected to the refilling module may be either stationary or mobile.

In one of the embodiments of present invention the refilling module of the spraying system of liquid means is designed to be able to empty the reservoir of the connected spraying device into one or more of the liquid sources.

The ground stations of the spraying system of liquid means according to preferred embodiment of the invention are of a modular design, and, besides said landing and refilling modules, the set of modules is further comprising at least:
- power supply module, designed to supply power to other station modules;
- ground station control module, designed to be able to contact with the control station and unmanned vehicles by the communication module;
- spraying device module, designed for the automated installation, dismantling and replacement of spraying device on an unmanned vehicle(s) and for storage of spraying devices;
- chassis, designed for installation of ground station modules thereon.

The spraying system of liquid means according to present invention is further comprising an emergency platform for parking, storage and maintenance of faulty unmanned vehicles.

In the preferred embodiment of present invention the unmanned vehicle of the spraying system of liquid means is an unmanned aerial vehicle.

BRIEF DESCRIPTION OF THE DRAWINGS

The essential features of the proposed technical solution are explained in drawings.

MODES OF EMBODIMENTS OF THE INVENTION (STATICS DESCRIPTION)

Figure 1:
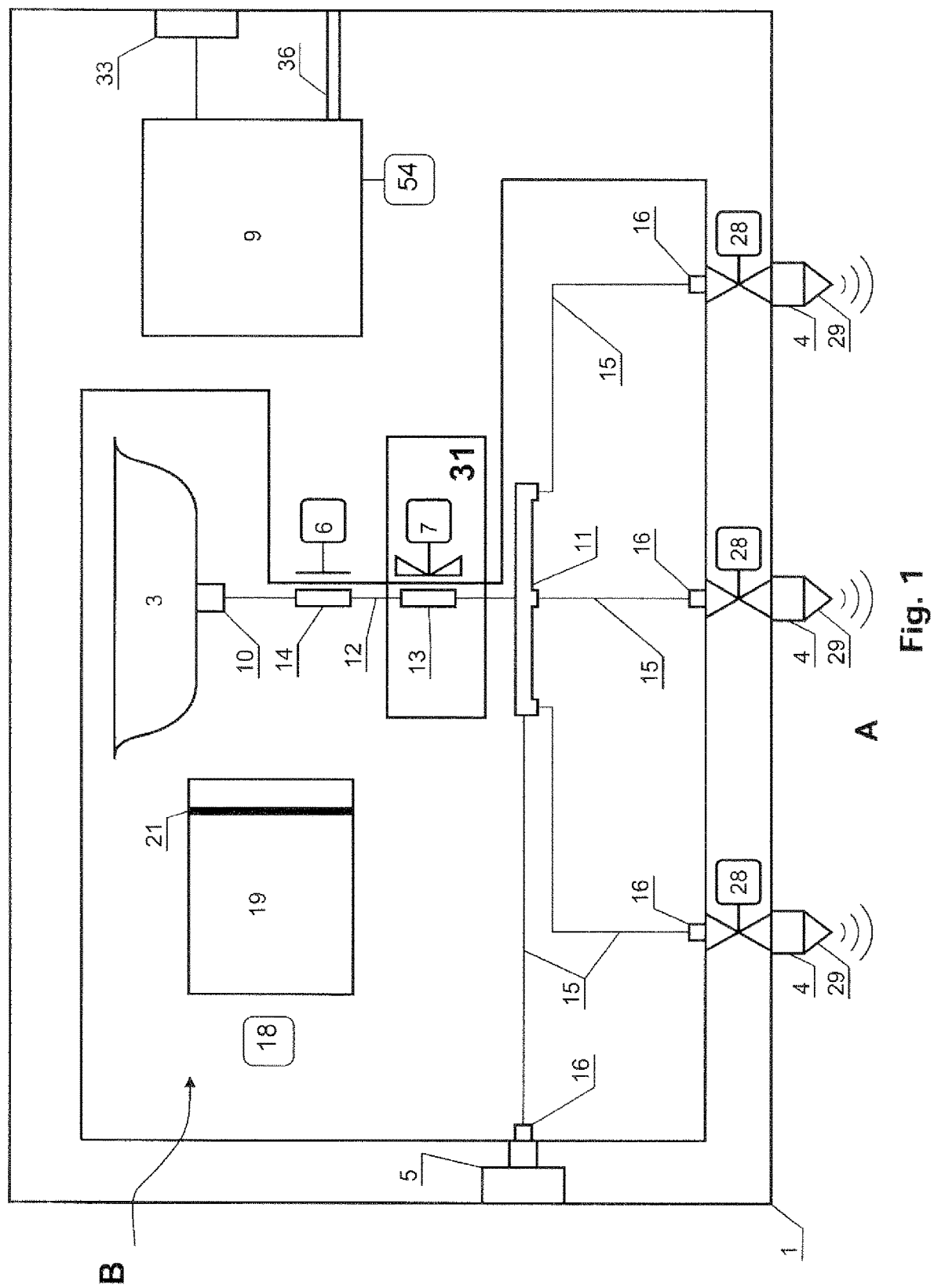
FIG. 1 shows the principal scheme of spraying device A of present invention, particularly the option of liquid subsystem B with central pumping chamber.

The variants of embodiments of the invention are disclosed as the examples illustrating this invention, however not limiting its scope of protection.

The key element of spraying system E according to present invention is spraying device A for liquid means of chemical treatment with a replaceable liquid subsystem B, which is an integral part of the spraying device A. Said invention objects: liquid subsystem B, spraying device A and spraying system E are all designed for spraying of liquid means of chemical treatment, and are united by a single inventive concept which includes the creation of entirely replaceable, properly marked and hermetically sealed liquid subsystem in a spraying device designed to be installed on unmanned vehicles and used in autonomous spraying systems. Moreover, said objects are organically interrelated and correlate as a part (liquid subsystem B), integrated into the whole (spraying device A) and, in turn, integrated into the system (spraying system E), comprising the spraying device as integral part thereof.

Spraying device A of spraying system E is to be considered first.

In general, spraying device A according to present invention comprises:
- one or several liquid subsystems B,
- housing of spraying device 1,
- basket 2 designed for storing reservoir 3 of liquid subsystem B,
- one or more spraying units 4,
- liquid refilling valve 5,
- liquid flow sensor and/or liquid presence detector 6,
- one central pumping engine 7 or several individual pumping engines 8,
- session controller 9.

Liquid subsystem B is an integral part of spraying device A.

Figure 2:
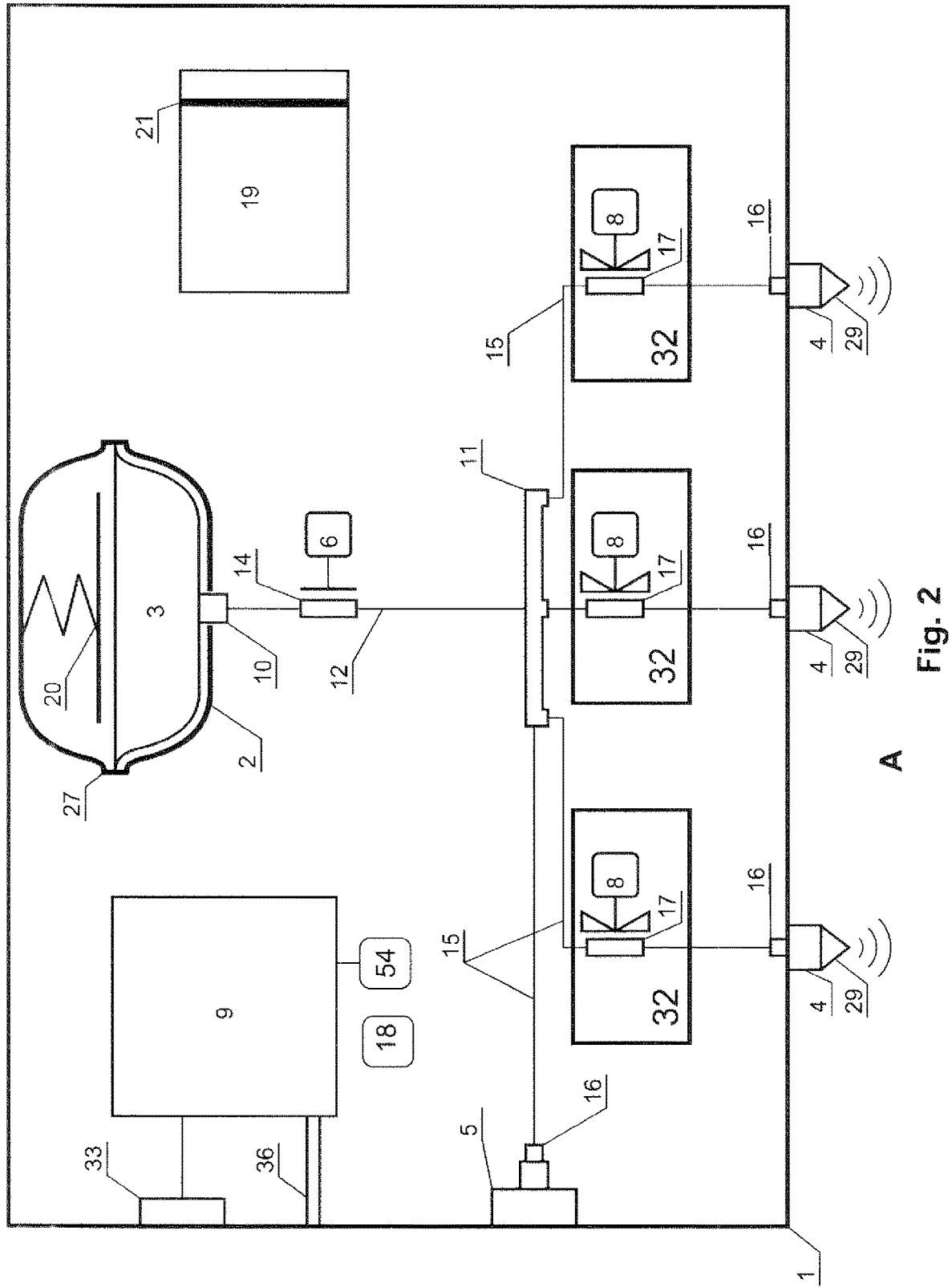
FIG. 2 shows the principal scheme of spraying device A of this invention, particularly the option of liquid subsystem B with individual pumping chambers, as well as a specified basket, equipped with a compression mechanism.
Figure 3:
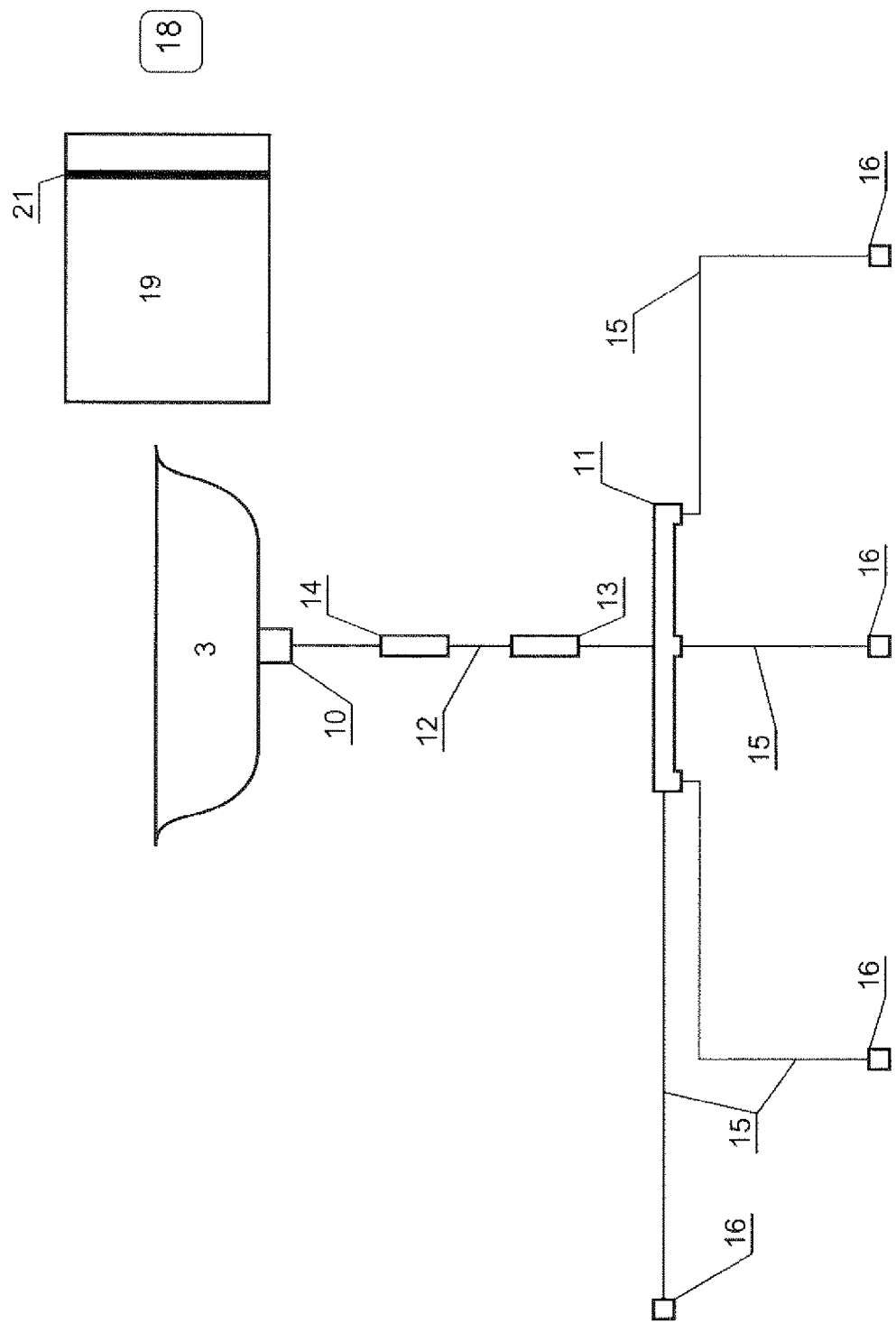
FIG. 3 shows liquid subsystem B option with a central pumping chamber.
Figure 4:
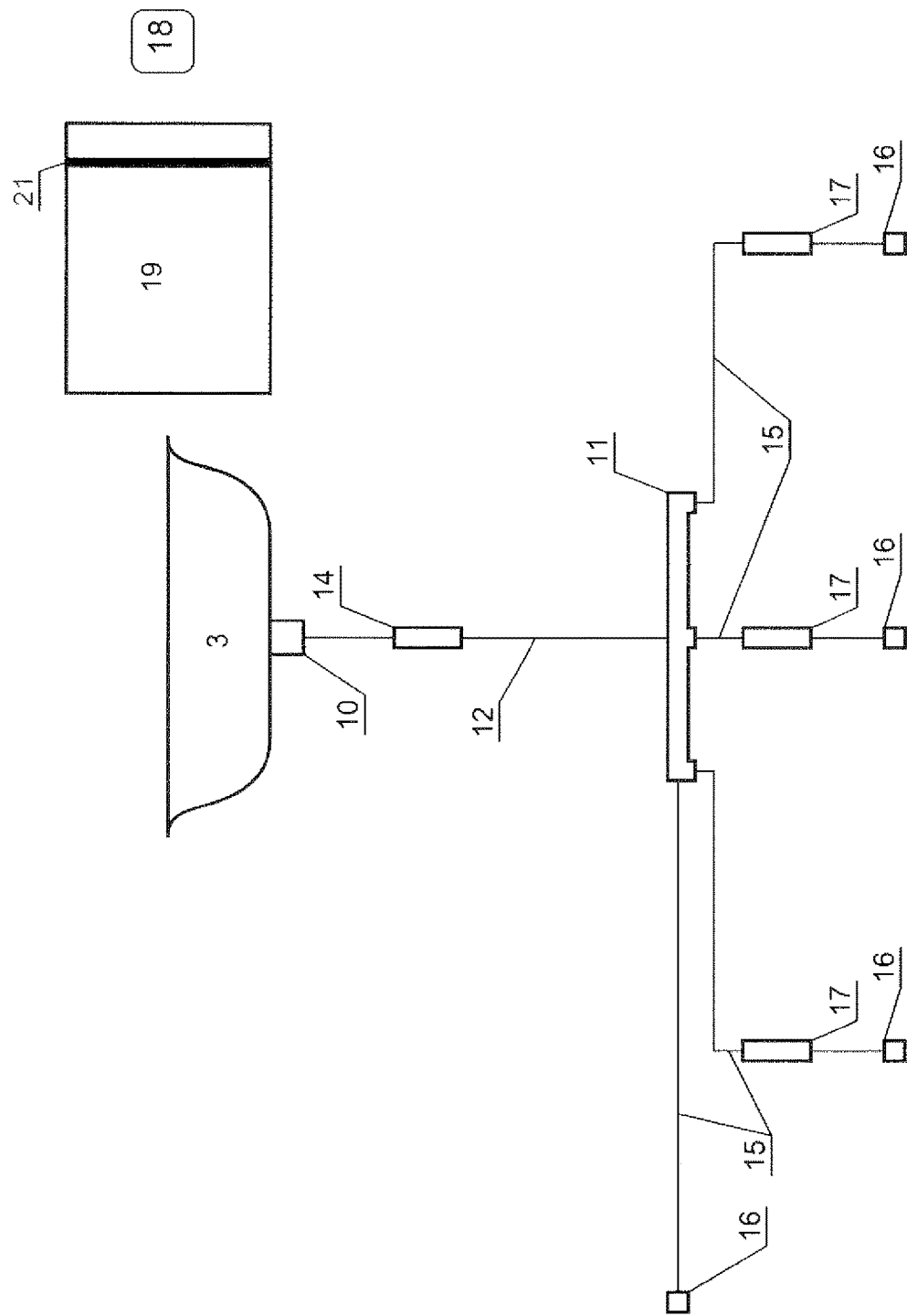
FIG. 4 shows liquid subsystem B option with individual pumping chambers.
Figure 5:
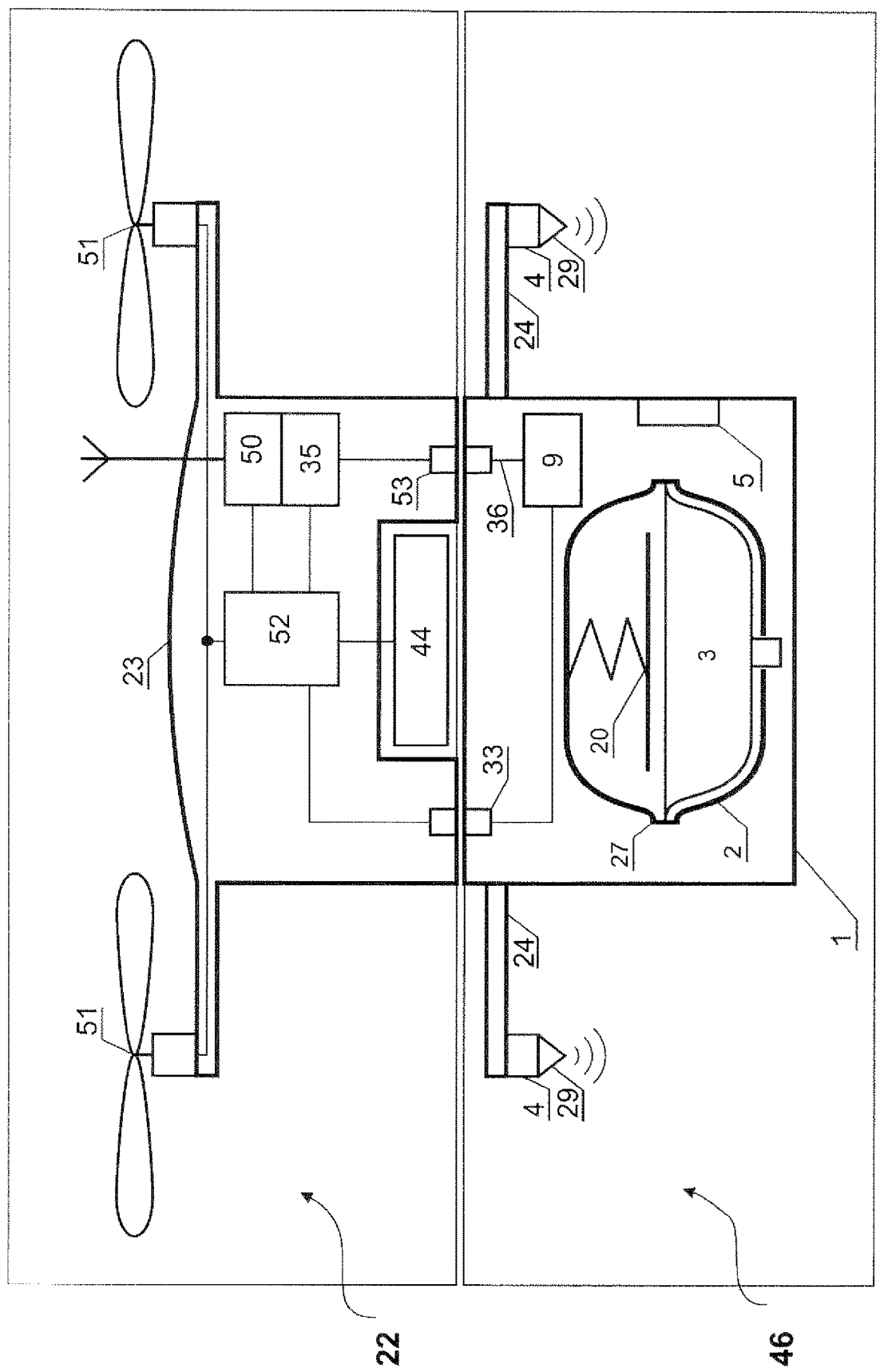
FIG. 5 shows an example of the layout of spraying device structure elements on an unmanned vehicle, particularly on an unmanned aerial vehicle.

FIG. 1 shows spraying device A, particularly the option of liquid subsystem B with a central pumping chamber, and FIG. 2—the option of liquid subsystem B with several individual pumping chambers.

Liquid subsystem B comprises:
- reservoir 3 which is made as a soft hermetic bag made from soft plastic (conventional, reinforced or laminated), and provided with outlet channel 10 in the lower part of the bag,
- manifold 11 with one or more ports, which is connected to outlet channel 10 of reservoir 3 through the manifold channel 12,
- manifold channel 12 which can comprise a central pumping chamber 13, and can be provided with a measuring section 14 designed for being placed into the outer liquid flow sensor and/or liquid presence detector 6;
- liquid hoses 15 of defined length. Each liquid hose 15 at one end is hermetically connected to one of manifold 11 ports, and at the other end is provided with special lock valve 16, which is liquid-impermeable for medium from subsystem B, when it is disconnected from the units of spraying device A. In the embodiment of this invention with several individual pumps, each liquid hose 15, designated for connection with the spraying units, can be equipped with individual pumping chamber 17;
- contactless tag 18 which identifies liquid subsystem B. The contactless tag can be applied on any element of liquid subsystem B, where this tag would be readable;
- storage bag 19, in which the entirely replaceable liquid subsystem B is supplied and utilized after use;
- central 13 or individual 17 pumping chambers; depending on the pumping engine to which they are assigned, chambers can be surrounded with additional elements which are also part of the liquid subsystem B. The liquid subsystem can have either a central pumping chamber 13, or several individual pumping chambers 17, however not all of them together.

Reservoir 3 contains the liquid to be sprayed (liquid means of chemical treatment); reservoir 3 is made from a polymeric material as a soft hermetic bag, which is placed on the bottom of a strong and rigid basket 2. Reservoir 3 can be pressed to the bottom of basket 2 with a compression mechanism 20, which is installed in basket 2 above reservoir 3, thus limiting the free movement of the liquid and preventing the centre of gravity from shifting.

Reservoir 3 is connected to manifold 11 through manifold channel 12.

Manifold channel 12 can be equipped with a special deformable central pumping chamber 13, which is designed to be inserted into the operating area of the central pumping engine 7 of spraying device A. Central pumping chamber can be made from an elastic material, insensitive to water and used liquids. For example, this can be a silicone hose, neoprene hose, BTP (butyl titanate) hose, Tygon® hose and a hose made from analogous materials.

Manifold 11 is connected with liquid hoses 15. Liquid hoses at the opposite end of manifold 11 are provided with lock valves 16, which in inconnected state are sealing the internal volume of liquid to be sprayed. Each liquid hose 15, designed to be connected with the spraying units, can be provided with a special deformable individual pumping chamber 17, designed to be inserted into the operating area of individual pumping engine 8 of spraying device A.

Liquid hoses 15 are standard plastic hoses/tubes made of soft material, which is inert to water and used liquids, and designed to operate under increased pressure conditions. For example, they can be made from polyurethane: PU (polyurethane), soft polyurethane, hard polyurethane; from nylon (soft nylon); from polymers (FEP (Fluoropolymer)), from silicon.

Pumping chambers 13 (FIG. 1) or 17 (FIG. 2) isolate the liquid from pumping engines 7 (FIG. 1) or 8 (FIG. 2), thus improving system maintenance.

Storage bag 19 has a hermetic lock 21, for example, zip lock, double zip lock or a structure of analogous purpose.

Storage bag 19 can be made from any soft material, which is inert to water and used liquid, for example, polyethylenes: PE (polyethylene), LDPE (low density polyethylene), HDPE (high density polyethylene); polypropylenes: OPP (oriented polypropylene), CPP (cast polypropylene); polyimide PI and analogous materials, including metallized options. Sealable storage bags are produced at large scale from these materials and they are widely available.

Contactless tag 18 can be of any suitable type, such as barcode (for example, CODE128), two-dimensional code (for example, QR code or Data matrix), radio-frequency identification (for example, NFC). Contactless tag 18 may have a rewritable memory for the autonomous storage of the operational history of liquid subsystem B (number of sessions, time under pressure and the like counters).

Liquid subsystem B can be easily separated and dismantled from spraying device A.

Liquid subsystem B is fixed:
in basket 2, and/or
at housing 1 of spraying device, and/or
in operational units (nodes) of spraying device A, for example, in spraying units 4.

Liquid subsystem B of spraying device A of present invention is made as single unit, is compact and hermetic when disconnected from spraying device A, and is utilized in a sealed storage bag 19, thus contributing to high level of safety for the personnel. It is marked with a contactless tag 18 for verification of its authenticity and registering its history of operation, which means standardization of the main units of spraying device A and assurance of the warranty characteristics of the device.

Spraying device A can be provided with one or more liquid subsystems B.

Housing 1 of spraying device A is made as a rigid structure where all or some of the elements of spraying device A are installed.

Housing 1 is installed on the unmanned vehicle 22 (for example, on an unmanned aerial vehicle, FIG. 5) and is carried by it. Part or whole housing or frame 23 of unmanned vehicle 22 can serve as housing 1.

Housing 1 may comprise static, telescopic or folding trusses or masts 24 onto which spraying units 4 and, optionally, other elements of the device (not shown in drawings) are fixed.

Spraying devices A, where part or whole of housing 23 of an unmanned vehicle is serving as housing 1, are considered to be partially or fully integrated into the unmanned vehicle 22. While, spraying devices A with an independed housing 1 are independent. Independent spraying devices A can be installed on unmanned vehicles 22 and removed therefrom in completely automated way by the ground station spraying device module 25. An example of installation of a spraying device as an independent module as shown on FIG. 5 is not excluding other variants of device A installation on an unmanned vehicle.

Independent spraying devices A are tested and refilled with liquid in an automated way by the ground station refilling module 26.

The structurally strong basket 2 is designed for reservoir 3 and limits its maximum permissible volume. Basket 2 is adapted for quick insertion of reservoir 3. For this purpose the basket is equipped with a removable or hinged lid 27. Basket 2 is provided with compression mechanism 20, which mechanically or pneumatically presses reservoir 3 to the bottom of basket 2. To reduce the weight of spraying device A, basket 2 can be of a porous structure (grid, combs, net of woven or glued carbon filaments), and optionally with an inner case, made of a light, strong and non-streachable material. Manifold channel 12 comes out of basket 2.

There may be one or more spraying units 4, where each spraying unit 4 is provided with:

a special port for hermetically connecting the lock valve 16 of liquid hose 15, an optional lock valve actuator 28. Lock valve actuator 28 is necessary in liquid subsystems B with central pumping chamber 13.

sprayer 29, which can be an airless nozzle, an air channel nozzle, centrifugal sprayers, etc.

Liquid refilling valve 5 is connected to manifold 11 with liquid hose 15.

The status of liquid refilling valve 5 is controlled by the refilling station 30. When liquid refilling valve 5 is disconnected from the refilling station 30, it does not pass neither air nor liquid in any direction. Measuring section 14 of manifold channel 12 is designed to be placed into a liquid presence detector and/or liquid flow sensor 6, which can be optical, ultrasonic, inductive, capacitive or of other type.

Pumping engines 7 (or 8) transport liquid by deforming pumping chambers 13 (or 17), in the manner, determined by the type of the pumping engine. Central pumping engine 7 and associated central pumping chamber 13, integrated into it, form together a central liquid pump 31. Individual pumping engine 8 and associated individual pumping chamber 17, integrated into it, form together an individual liquid pump 32. The pumping engine defines the shape and dimensions of the corresponding pumping chamber 13 (or 17), as well as additional system elements (not shown in drawings), necessary for the proper operation of the resultant liquid pump.

In the spraying device according to present invention pumping chambers and pumping engines may be configured into following pump types:

Peristaltic pump. In this case, a piece of elastic hose is used as a pumping chamber and no additional elements are necessary.

Diaphragm pump. In this case, check valves are provided on both sides of the pumping chamber. Opposite surfaces of the chamber are equipped with special fastenings to the pumping engine. The pumping engine provides periodic reciprocating motion for these fastenings. When fastenings move further away from each other (and accordingly pumping chamber surfaces), pressure decreases in the chamber and liquid fills the chamber through the inlet check valve. During reverse motion, liquid is squeezed further through the outlet check valve into the liquid subsystem.

Other positive displacement pumps of appropriate type.

The spraying device comprises a single central pumping engine 7 or several individual pumping engines 8.

If only one central pumping engine 7 (FIG. 1) is used in spraying device A, then the central pumping chamber 13, used in liquid subsystem B of this device, is installed onto the manifold channel 12.

If individual pumping engines 8 (FIG. 2) are used in spraying device A separately for each spraying unit 4, then liquid hoses 15 designed to be connected with spraying units 4 must be equipped with individual pumping chambers 17.

Session controller 9 is a microprocessor based device.

Session controller 9 is design to be able to receive power from unmanned vehicle 22 through the session controller power supply port 33, as well as to supply power to all elements of spraying device A which require it. During refilling, session controller 9 receives a session description from control station 34, stores this session description in its memory and tracks its stages and current status.

Session controller 9 coordinates/synchronizes the motion of unmanned vehicle 22 according to the stages of the session and actions necessary during the session, by interacting with the motion controller 35 of unmanned vehicle 22 by communication channel 36.

Session controller 9 controls spraying device A by the sequence of executable commands for the following elements:

lock valve actuators 28 and central pumping engine 7, or individual pumping engines 8.

Session controller 9 regulates liquid flow by controlling the frequency of pumping engines movements, deforming pumping chambers.

Session controller 9 can transmit the stage and current status of the session through communication channel 36 to the motion controller 35 of unmanned vehicle 22 (for example, for further data transmission to control station 34).

Session controller 9 can be combined with motion controller of the unmanned vehicle 22 or can be integrated into it.

Unmanned vehicles equipped with spraying devices A can operate in groups fully automatically in the spraying system E according to present invention, which comprises the ground station park and the control station.

Figure 6:
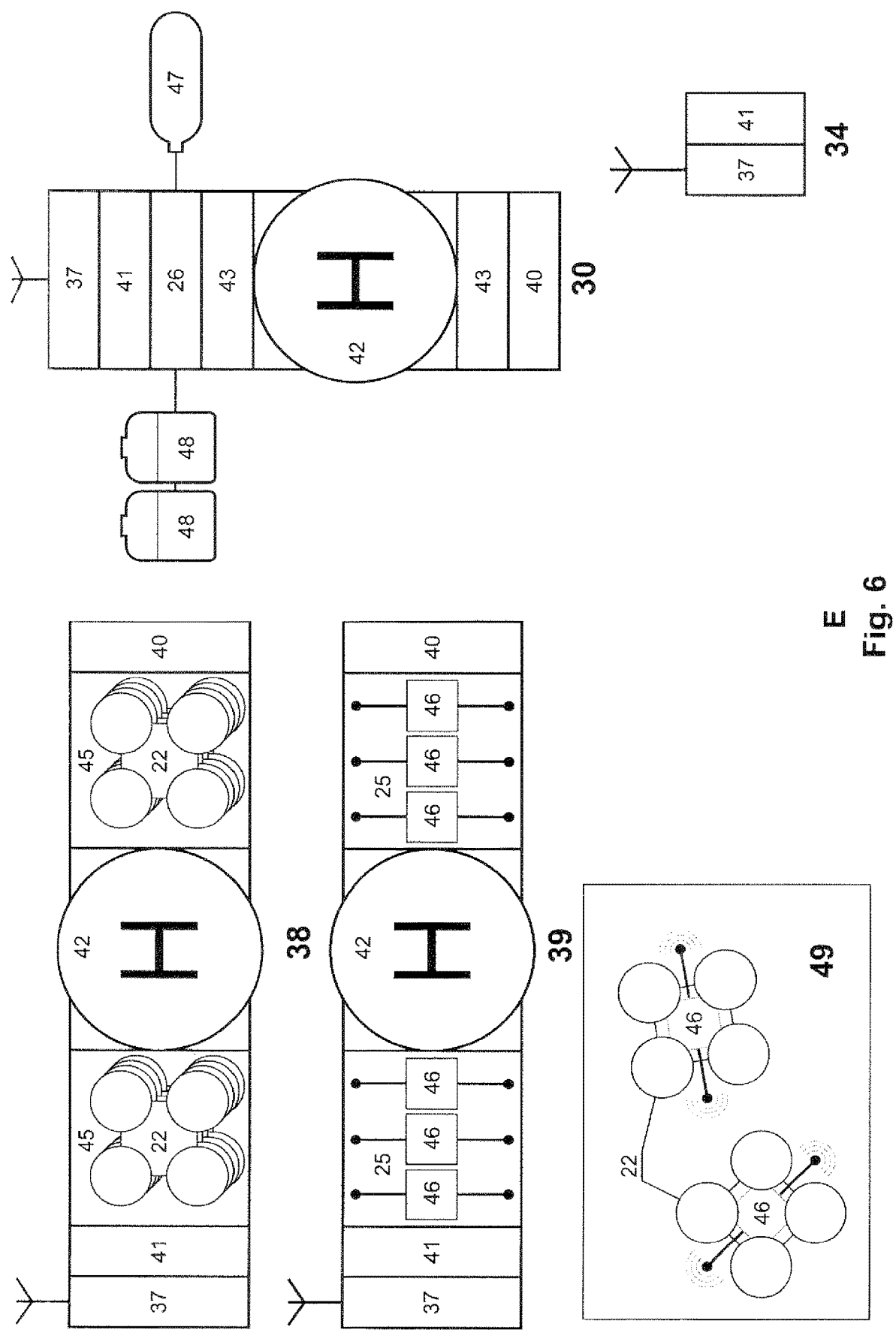
FIG. 6 shows the variant of the structure of the spraying system E according to present invention.

According to one of preferred embodiments of the invention, spraying system E (FIG. 6) comprises:
spraying device A installed on unmanned vehicle 22,
control station 34,
ground stations.

Control station 34 is designed for the centralized automatic control of group of unmanned vehicles 22, related to this control station, and park of the ground stations.

Communication module 37 provides connection between the control station 34 and unmanned vehicles 22 and ground stations.

Ground stations of spraying system E are designed for the automatic servicing of unpowered unmanned vehicles 22 and spraying devices A integrated on them or carried by them. Ground stations are composed of modules, where various module combinations are possible to obtain a ground station, optimized for specific application, i.e. to obtain a ground station with defined functions, such as refilling station 30, parking station 38 and storage station 39.

Main ground station modules are as follows:
power supply module 40 with the power bus of other station modules;
ground station control module 41, which is autonomous and is controlled by control station 34. Ground station control module 41 comprises a communication module 37 to contact with control station 34 and unmanned vehicles 22,
landing module 42, where unmanned vehicle 22 completes its movement, being properly positioned and fixed to perform the necessary subsequent operations, which will be carried out by other ground station modules. Landing module 42 can transfer the unmanned vehicles 22 fixed in it to or from another station modules;
batteries module 43 designed for storing, replacing and/or charging batteries 44 of unmanned vehicle 22. Here completely or partially discharged batteries 44 of unmanned vehicle 22 are replaced with charged batteries;
unmanned vehicles module 45, designed for secure and compact automated storage of unmanned vehicles 22;
spraying device module 25, designed for secure and compact automated storage of independent modular spraying device A 46, as well as their mounting on unmanned vehicles 22;
refilling module 26, designed for the automated refilling with liquid of spraying devices A (modular spraying device 46) of unmanned vehicles 22, fixed in a proper position relative to the refilling module 26 (for example, fixed in landing module 42), as well as for pouring out the liquid from a faulty spraying device. Refilling module 26 also checks the authenticity of liquid subsystem B by exchanging information with the contactless tag 18 of the liquid subsystem. This module in a contactless way loads the description of a session, following the refilling, into the session controller 9. This module can be connected to the source 47 of prepared compressed air (dried and filtered) for testing of spraying devices A, and/or connected to one or several sources 48 of liquid to be sprayed. Refilling module 26 performs the testing of the hermetic properties of liquid subsystems B with air and, possibly, liquid, when spraying devices A are connected for refilling. Refilling module 26 can be used for refilling liquid sources 48 from the reservoirs 3 of spraying devices A;
chassis M (not shown in the drawings) on which ground station is installed.

Refilling station 30 of spraying system E is a ground station, designed for the automatic refilling of spraying devices A and charging or replacement of batteries 44 of unmanned vehicle.

Main elements of refilling station 30 are as follows:
power supply module 40,
landing module 42,
batteries module 43,
refilling module 26,
liquid sources 48,
optionally, compressed air source 47,
chassis M.

Parking station 38 is a ground station, designed for secure and automatic storage of unmanned vehicles 22 and can be used for transporting unmanned vehicles.

Parking station 38 comprises:
power supply module 40,
landing module 42,
unmanned vehicles module 45,
chassis M.

Storage station 39 is a ground station, designed for the automated storage of the modular spraying device A 46, and can be used for transporting of spraying devices A.

Storage station 39 necessarily comprises:
power supply module 40,
landing module 42,
spraying device module 25,
chassis M.

Emergency platform 49 is designed for parking of unmanned vehicles 22, when the unmanned vehicle 22 itself is faulty or spraying device A integrated therein is critically damaged, or when all spraying devices modules 25 of ground stations all are faulty.

Spraying Device and System Operation

Installation of a new replaceable liquid subsystem B into a spraying device A In order to install liquid subsystem B into spraying device A, a new storage bag 19 is opened and a new liquid subsystem B is extracted therefrom.

Lid 27 of basket 2 is opened. Reservoir 3 is placed into basket 2. Manifold channel 12 comes out of basket 2.

In the invention embodiment option with a central pump 31 the central pumping chamber 13 is placed into a central pumping engine 7 and fixed therein. Manifold 11 is fixed, and measuring section 14 of manifold channel 12 is placed into the liquid flow sensor and/or liquid presence detector 6. Then liquid hoses 15 are installed in their places and fixed.

In the invention embodiment option with individual pumps 32 individual pumping chambers 17 of liquid hoses 15 are placed into individual pumping engines 8 and fixed therein.

One appropriate liquid hose 15 is connected to the liquid refilling valve 5, in case it is not included in the subsystem B set. Otherwise, the liquid refilling valve 5 is fixed on housing 1 of spraying device A. After that, lock valves 16 are connected to the spraying units 4, and then lid 27 of basket 2 is closed.

Spraying device A is prepared for operation or for mounting on unmanned vehicle 22 (if it is not integrated into it).

Prepared spraying device A can be mounted on an unmanned vehicle or installed in a free slot of spraying devices module 25 of storage station 39.

When performing self-diagnosis and refilling the spraying device A by module 26, the spraying device must be fixed in a proper position relative to refilling module 26. For example, this happens automatically, when unmanned vehicle 22 is fixed in proper position in the landing module 42 of refilling station 30.

Further operations are performed when power is available in session controller 9.

Refilling module 26 is connected to the liquid refilling valve 5. Refilling module 26 pumps the compressed air into reservoir 3. During this operation the pumping engines must be stopped. Pressure and leakage in reservoir 3 are checked according to the dynamics of change of air pressure in liquid subsystem B by the corresponding pressure sensor located in refilling module 26.

After that refilling module 26 stops supplying air, however continues to monitor the dynamics of change of air pressure in reservoir 3. Air is discharged from reservoir 3 into the atmosphere by alternating and short-term activations of pumping engines 7 or 8, and a conclusion is made on the operable condition of pumping engines 7 or 8, as well as on the hermetic properties of liquid subsystem B.

Refilling station 30 enables all the air to escape from reservoir 3 through the refilling valve 5, where air is squeezed out mechanically by compression mechanism 20 or pumped out by refilling module 26. Refilling module 26 then pumps liquid into reservoir 3. In the process the pressure changes in reservoir 3, proper operation of the system and the absence of leakage in the liquid subsystem are monitored.

If leakage is found, refilling module 26 begins receiving liquid from reservoir 3 under the pressure of compression mechanism 20 and under possible reverse pumping by refilling module 26.

If critical failure is detected, unmanned vehicle 22 is sent to emergency platform 49 or to storage station 39, where liquid subsystem B or the whole modular spraying device A 46 is replaced. By pumping out liquid from reservoir 3, refilling module 26 can refill liquid sources 48 with liquid or its concentrate.

During spraying, liquid flow (consumption) is set by the frequency of deformation of pumping chambers by pumping engines. Liquid flow (consumption) control is performed continuously during the spraying stages.

Necessary interruptions during spraying are done by stopping the pumping engines. If one central pumping chamber 13 is used in liquid subsystem B, then spraying can be interrupted by controlling the lock valves 16 of spraying units 4, however at least one lock valve 16 must be opened when the central pumping engine 7 is operating.

The moment of liquid depletion is determined according to the liquid flow sensor and/or liquid presence detector 6.

Liquid subsystem B can be dismantled and/or replaced.

Before disconnecting liquid subsystem B, an employee should use individual protection means, for example, put on gloves and a respirator.

Spraying device A must be dismantled from the unmanned vehicle 22, if it is not integrated into the unmanned vehicle.

If liquid refilling valve 5 is part of the liquid subsystem B, then it is removed from housing 1 or basket 2. Reservoir 3 is removed from basket 2.

Reservoir 3 is placed into storage bag 19 together with refilling valve 5.

All pumping chambers 13 and 17 are emptied, then manifold 11 is removed and inserted into storage bag 19. Liquid hoses 15 are then disconnected one by one and stowed into the storage bag 19. Filled storage bag 19 is sealed with lock 21 and sent for utilization.

Advantages of the proposed equipment and evidence of solution of the problem

The proposed technical solution provides:
Replaceable liquid subsystem B marked with a contactless tag, which means:
personnel safety,
possibility to track the warranty period, use only original liquid subsystems during the warranty period, possibility of testing the system during manufacture, uniform quality standard.

Compact form of the liquid subsystem to be utilized, when the liquid subsystem is placed into a storage bag for utilization.

Possibility to control liquid supply to each spraying unit separately, which means:
flexibility when forming the spraying session,
possibility to temporary operate the vehicle with one faulty unit out of several spraying units, by dynamic adjustments of the spraying width.

Automatic control of the serviceability of the main units of spraying device and hermetic properties of the liquid subsystem using only air with no liquid, during refilling by the refilling module, which is safe for the personnel.

Liquid movement in the reservoir is limited by a compression mechanism. Such solution does not allow the centre of gravity to shift. Liquid in the reservoir does not splash around and does not swing the unmanned vehicle during motion, therefore the unmanned vehicle can be positioned more precisely.

Automated refilling, which means:
avoiding personnel contact with the liquid,
high quality filtration and absence of contaminants in the reservoir.

INDUSTRIAL APPLICABILITY

The proposed technical solution can find application in the field of agriculture, as well as in other industries, where there is need to spray any type of liquid means according to a specified program.

For example, such devices and systems can be used for extinguishing fires, watering football fields, watering city streets when cleaning them during the hot season, as well as for painting or other decorative treatment of large-scale objects (for example, building roofs) or large areas.

List of the positions of spraying device and system elements:

A—spraying device
B—liquid subsystem
E—spraying system
M—chassis
1—housing of spraying device
2—basket
3—reservoir
4—spraying unit
5—liquid refilling valve
6—liquid flow sensor or liquid presence detector
7—central pumping engine
8—individual pumping engine
9—session controller
10—reservoir outlet channel
11—manifold
12—manifold channel
13—central pumping chamber
14—measuring section of manifold channel
15—liquid hoses
16—lock valves
17—individual pumping chamber
18—contactless tag
19—storage bag
20—compression mechanism
21—storage bag lock
22—unmanned vehicle
23—unmanned vehicle housing
24—static, telescopic or folding trusses or masts
25—spraying device module
26—refilling module
27—basket lid
28—lock valve actuator
29—sprayer
30—refilling station
31—central pump
32—individual pump
33—session controller power supply port
34—control station
35—motion controller
36—communication channel
37—communication module
38—parking station
39—storage station
40—power supply module
41—ground station control module
42—landing module
43—batteries module
44—batteries
45—unmanned vehicles module
46—modular spraying device A
47—compressed gas source
48—liquid source
49—emergency platform
50—communication with control station unit
51—propulsion system
52—power supply subsystem
53—communication port
54—contactless tag reader

The invention claimed is:

1. A liquid subsystem for use in a spraying device mounted on an unmanned vehicle, the liquid subsystem comprising a reservoir, made in the form of a bag, provided with an outlet channel, and at least one liquid hose, connecting to the reservoir, and provided with a lock valve,
wherein the liquid subsystem is designed as a separable single unit and entirely replaceable device,
wherein the liquid subsystem comprises a manifold with one or more outlet ports, which connects the at least one liquid hose to the reservoir via a manifold channel from the manifold to an outlet channel of the reservoir,
wherein each liquid hose at one end is hermetically connected to one of the outlet ports of the manifold, and at the other end is provided with said lock valve, which is closed in a disconnected state, sealing the internal volume of a liquid to be sprayed with the liquid subsystem,
wherein said liquid subsystem further comprises either one central or several individual pumping chambers of one or more liquid pump, wherein the pumping chambers are integrated into said liquid subsystem to be replaced together with it and are deformable, designed to be inserted into the corresponding liquid pump of the spraying device, of which the liquid subsystem is a replaceable part,
wherein:
in a presence of a single central pumping chamber of each liquid pump, the manifold channel is equipped therewith, or
in a presence of several individual pumping chambers of each liquid pump, each liquid hose, designed for connecting with an appropriate spraying unit, is equipped with said individual pumping chamber, wherein said liquid subsystem further comprises a contactless tag, made as a barcode, two-dimensional code or as a contactless radio frequency tag, wherein the contactless tag contains read-only information comprising one or more of a unique identifier of the liquid subsystem, a date of manufacture, a warranty expiry date, a designation of compatibility with various liquids, a designation of maximum operating pressure, or a number of provisioned cycles of use, wherein the contactless tag further comprises variable indicators of the liquid subsystem, and wherein the variable indicators comprise one or more of an identifier of the used liquid type, impermeability status of the liquid subsystem, or a counter for the cycles of use.

2. The liquid subsystem according to claim 1, wherein the liquid subsystem further comprises a sealable storage bag, in which the entirely replaceable liquid subsystem is supplied and utilized after use.

3. The liquid subsystem according to claim 1, wherein the manifold channel is provided with one or more measuring sections for being placed into outer liquid flow sensors and/or liquid presence detectors, wherein said outer liquid sensors and/or liquid presence detectors, into which said measuring section is placed, is ultrasonic, optical, inductive or capacitive.

4. The liquid subsystem according to claim 1, wherein a size and form of said pumping chamber(s) are defined by the type of appropriate liquid pump, wherein said central pumping chamber is placed into the operating area of the central pumping engine of appropriate central liquid pump, and wherein each individual pumping chamber is placed into the operating area of the pumping engine of appropriate individual liquid pump.

5. The liquid subsystem according to claim 1, wherein the reservoir is impermeable for liquid medium, and is made of material selected from a group of chemically inert polymeric materials consisting of single- or multilayer films of thermoplastic polyurethane, silicone, rubber, polyimide, polyethylene, and polyamide.

6. A spraying device, mounted on an unmanned vehicle and comprising at least one liquid subsystem as defined in claim 1, a housing, spraying unit(s) with sprayer(s), a spraying device controller, and one or more pumps adapted for transporting of liquid from the liquid subsystem to the spraying unit(s), wherein each liquid subsystem is fixed in the nodes of spraying device with the possibility of quick installation, dismantling and/or replacement thereof, wherein the reservoir of each liquid subsystem is placed into a basket of the spraying device, wherein the one or more pumps adapted for transporting of liquid from each liquid subsystem to the spraying unit(s) comprise one central liquid pump or several individual liquid pumps, which pumping chamber(s) is(are) integrated into each replaceable liquid subsystem, wherein each spraying unit is hermetically connected with a lock valve of an appropriate liquid hose of the corresponding liquid subsystem, wherein a spraying device controller is a session controller, which is designed to control flow rate taking into account the readings of feedback sensor, wherein the feedback sensors comprise at least the liquid flow sensor(s) and/or liquid presence detector(s), and wherein the spraying device is further equipped with a contactless reader of the contactless tag of each liquid subsystem, said contactless reader being connected to the session controller.

7. The spraying device according to claim 6, wherein the spraying device further comprises a compression mechanism, pressing the reservoir to the bottom of the basket.

8. The spraying device according to claim 6, wherein each liquid pump is a positive displacement pump of appropriate type, wherein the positive displacement pump is of peristaltic, diaphragm or piston type.

9. The spraying device according to claim 6, wherein the spraying device comprises either a single central or several individual pumping engines which, together with appropriate deformable pumping chambers, form either a single central pump or several individual pumps, correspondingly.

10. The spraying device according to claim 6, wherein the spraying device is provided with one or more liquid refilling valves, each being connected to a corresponding liquid subsystem manifold through an appropriate liquid hose, and which is designed for refilling of liquid subsystem with liquid, wherein said liquid refilling valves are controlled by a refilling station and being disconnected from the refilling station, they do not allow neither air nor liquid to pass in neither direction, and wherein said liquid refilling valve(s) is(are) designed for automated refilling and/or emptying of the spraying device.

11. The spraying device according to claim 6, wherein each spraying unit comprises a lock valve actuator.

12. The spraying device according to claim 6, wherein any spraying unit comprises one or more sprayer(s), wherein any sprayer being of siphon, centrifugal or disk type, an airless type nozzle or an air-assisted nozzle.

13. The spraying device according to claim 6, wherein the session controller is a microprocessor based device designed to regulate liquid flow by controlling a frequency of movements of pumping engines, deforming the appropriate pumping chambers, wherein the spraying device is equipped with communication channel(s) over which the session controller is interacting with the motion controller of the unmanned vehicle.

14. The spraying device according to claim 6, wherein the unmanned vehicle is designed to serve as an energy source for the session controller, which is able to further serve for powering other elements of spraying device.

15. The spraying device according to claim 6, wherein housing or frame of the unmanned vehicle is designed to serve as the housing of spraying device, and in that the entire housing of the spraying device or part thereof is designed to serve as the basket equipped with a hinged or removable lid, wherein said housing comprises trusses/masts onto which spraying units and other components of spraying device are installed, wherein trusses/masts are made static, telescopic or foldable.

16. The spraying device according to claim 6, wherein the spraying device is made in a form of a module designed for automated installation, removal or replacement on an unmanned vehicle.

17. A spraying system comprising one or more unmanned vehicles with mounted spraying device(s) according to claim 6, a complex of one or more ground stations for automated refilling of spraying device(s), mounted on an unmanned vehicle, and a control station controlling said complex of the ground stations and motion of unmanned vehicle(s), wherein said complex of ground stations comprises a station(s) equipped at least with:

a landing module, designed for reliable positioning therein of an unpowered unmanned vehicle(s), and a refilling module (26), which is connected to a compressed gas source (47) and liquid source (48), and which is designed for automated refilling of said spraying device, mounted on an unmanned vehicle, located in the landing module, with sprayable liquid by connecting to the liquid refilling valves of said spraying device.

18. The spraying system according to claim 17, wherein the refilling module is connected to one or more liquid sources and is designed to be able to empty the reservoir of the connected spraying device into one of liquid sources, wherein any liquid source connected to the refilling module is either stationary or mobile.

19. The spraying system according to claim 17 wherein the ground stations are of modular design, and, besides said landing and refilling modules, a set of modules further comprises at least:

a power supply module designed to supply power to other station modules;

a ground station control module designed to be able to contact with the control station and unmanned vehicles by a communication module;

a spraying device module, designed for automated installation, dismantling and replacement of spraying device(s) on an unmanned vehicle(s) and for storage of spraying devices;

a chassis, designed for installation of ground station modules thereon; and an emergency platform for parking, storage and maintenance of faulty unmanned vehicles.

20. The spraying system according to claim 17, wherein the unmanned vehicle is an unmanned aerial vehicle.

* * * * *